Dec. 13, 1932.   G. E. LE COUNT   1,891,101
SPRING DRIVE
Filed Nov. 23, 1931
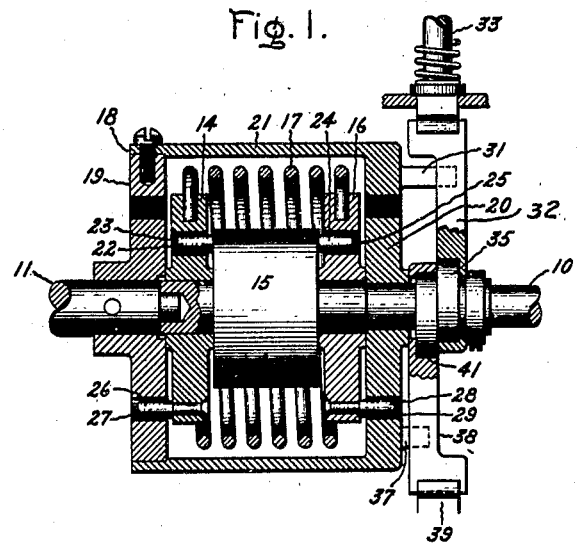
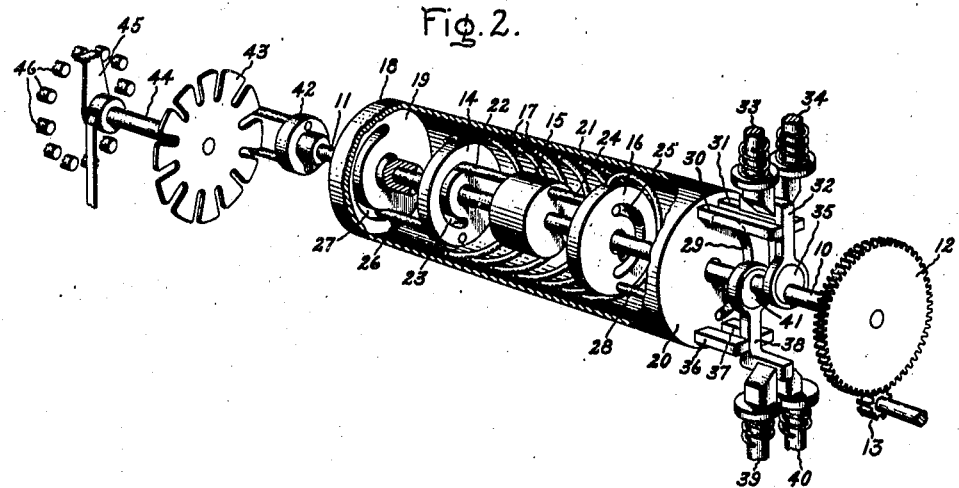
Inventor:
George E. LeCount.
by Charles E. Tullar
His Attorney.

Patented Dec. 13, 1932

1,891,101

UNITED STATES PATENT OFFICE

GEORGE E. LE COUNT, OF PITTSFIELD, MASSACHUSETTS, ASSIGNOR TO GENERAL ELECTRIC COMPANY, A CORPORATION OF NEW YORK

SPRING DRIVE

Application filed November 23, 1931. Serial No. 576,686.

My invention relates to spring drives. In the operation of valves, switches and some other devices, it is sometimes desired that an intermittently driven device be operated very quickly by some driving device which operates and moves much more slowly. The general object of the present invention is to provide an improved construction and arrangement of spring drive of this general type.

Other objects and advantages will be explained in the following description taken in connection with the accompanying drawing in which Fig. 1 is a longitudinal sectional view of a spring drive constructed in accordance with the invention and Fig. 2 is a diagrammatic perspective view of the spring drive, parts being broken away to reveal details, and the drive being shown as applied in the operation of an electric switch.

Like reference characters indicate similar parts in both figures of the drawing.

The invention is shown in its preferred form in Fig. 1 and the same construction is shown in Fig. 2 but with the component parts spread apart along the axis of the device to make the construction and operation more clear. The device includes two shafts 10 and 11 aligned along a common axis, the shaft 10 being a driving shaft which may be operated by any suitable source of power and the shaft 11 being a driven shaft which may be connected to any load which the spring drive is adapted to operate. Gears 12 and 13 are shown for rotating the driving shaft in either direction desired. Three disks 14, 15 and 16 surround the driving shaft 10, the central disk 15 being fixed to this shaft and the outer disks 14 and 16 being rotatable relatively to this shaft. A helical spring 17 surrounds the three disks 14, 15 and 16 and the driving shaft 10 and has its opposite ends secured to the outer two disks 14 and 16 respectively. The spring 17 is preferably normally under some tension so that it always tends to unwind itself and produce relative rotation between the outer disks 14 and 16. The driving shaft 10, spring 17 and the three disks 14, 15 and 16 are enclosed by a rigid cylindrical casing 18 including two end plates 19 and 20 rigidly connected by a cylinder 21.

The end plate 20 is relatively rotatable about the driving shaft 10 but the end plate 19 is rigidly fixed on the driven shaft 11.

The outer end of a pin 22 projecting from one side of the disk 15 enters a slot or groove 23 in the disk 14. This slot or groove 23 is concentric with the driving shaft 10 so that there can be relative rotation of the two disks 14 and 15 with the outer end of the pin 22 moving in the groove 23. The groove 23 is long enough to permit relative rotation of at least 180° between the two disks 14 and 15.

The outer end of another pin 24 projecting from the other side of the disk 15 enters a slot or groove 25 in the disk 16. This groove 25 is similar to the groove 23, being concentric with the driving shaft 10 and long enough to permit relative rotation of at least 180° between the two disks 15 and 16.

The spring 17 constantly tends to rotate the two disks 14 and 16 in opposite directions relatively to each other so that each of these disks is normally held with one end of its groove pressed against its respective pin but with the grooves extending around the driving shaft 10 in opposite directions from their pins as shown in Fig. 2.

The outer end of a pin 26 projecting from one side of the disk 14 enters a slot or groove 27 in the end plate 19 of the casing 18, the groove 27 being concentric with the driven shaft 11 and at least long enough to permit relative rotation of 180° between the disk 14 and the end plate 19. The outer end of a similar pin 28 projecting from one side of the disk 16 enters a slot or groove 29 in the end plate 20 of the casing 18, the groove 29 being concentric with the driving shaft 10 and at least long enough to permit relative rotation of 180° between the disk 16 and the end plate 20. The tendency of the spring 17 to rotate the two disks 14 and 16 in opposite directions holds each of the two pins 26 and 28 against one end of its groove with the two grooves 27 and 29 extending around the shafts 11 and 10 respectively in opposite directions from their pins as shown in Fig. 2.

The two end plates 19 and 20, being rigidly connected together by the cylinder 21, thus limit the relative rotation of the disks 14 and 16 and keep the spring 17 under the desired tension.

The casing 18 with the driven shaft 11 is normally prevented from rotating by a pair of spaced stops or guides 30 and 31 engaging an arm 32, the outer end of the arm 32 being held between two beveled spring pressed latches 33 and 34 and the inner end of the arm 32 being journaled on an eccentric 35 on the driving shaft 10. In order that the forces may be better balanced, it may be desirable in some cases to provide a second pair of spaced stops or guides 36 and 37 on the end plate 20 to engage an arm 38, the outer end of the arm 38 being held between two beveled spring pressed latches 39 and 40 and the inner end of the arm 38 being journaled on an eccentric 41 on the driving shaft 10. The second pair of latches 39 and 40 will always be needed, however, as will appear later.

The driven shaft 11 may be turned or rotated in either direction desired by rotating the driving shaft 10 in the corresponding direction by any suitable means as by the gear 12 and worm 13. Suppose the driving shaft 10 to be rotated in a clockwise direction. As it starts to rotate, its eccentrics 35 and 41 will begin to withdraw the arms 32 and 38 from the latches 33, 34, 39 and 40 but the casing 18 and the driven shaft 11 cannot rotate until the arms 32 and 38 have been entirely withdrawn from the latches. The rotation of the driving shaft 10, however, rotates with it the disk 15 and its pins 22 and 24. The pin 24 merely moves along the groove 25, the disk 16 being prevented from rotating by the engagement of its pin 28 with the end of the groove 29 in the end plate 20. The pin 22, however, engages the end of the groove 23 and rotates the disk 14 which carries its end of the spring 17 with it and winding or tightening up the spring, the other end of which is held by the disk 16. The grooves and pins form lost motion connections between the end plates and disks and their respective pins, the ends of the grooves forming spaced stops for their respective pins.

The eccentrics 35 and 41 rotate with the driving shaft and withdraw the arms 32 and 38 from the latches 33, 34, 39 and 40 until the shaft 10 has completed just one half of a revolution when the arms reach the tips of the latches and are thus disengaged from them. The casing 18 with the driven shaft 11 is now free to rotate. By this time, the pins 24 and 26 have traveled in their respective grooves 25 and 27 until they have reached the opposite ends from which they started. While the disk 14 holds its end of the spring 17, the opposite end of the spring now rotates the disk 16 with its pin 28 and this pin 28 forces the casing 18 and the driven shaft 11 to rotate very quickly through one half of a revolution. During this half revolution of the casing 18, the casing carries the arms 32 and 38 with it about their eccentrics 35 and 41. The arms 32 and 38 are thus forced outwardly by the eccentrics so that each arm is caught and stopped between a pair of latches at the end of the half revolution of the casing 18. During the half revolution of the casing 18, too, the disk 16 and the end plate 19 rotate until the trailing ends of their grooves 25 and 27 reach the respective pins 24 and 26. The device is now ready to repeat the cycle which has been described so long as the driving shaft 10 is rotated in a clockwise direction.

The operation of the device in the opposite direction is similar to the operation which has been described. Suppose the driving shaft 10 to be rotated in a counterclockwise direction. The disk 15 and its pin 24 will force the disk 16 to wind up its end of the spring 17, the other end of the spring being held by the disk 14, its pin 26 and the end plate 19 of the casing 18. After one half revolution of the driving shaft 10, the arms 32 and 38 are released from their latches and the casing 18 with the driven shaft 11 is rotated through a half revolution by the spring 17, one end of the spring acting on the casing through the disk 14 and its pin 26 while the other end of the spring is held by the disk 16 which wound it up.

It will be obvious from the preceding description that the driven shaft 11 may be rotated quickly through a half revolution any number of times and in either direction desired by rotating the driving shaft 10 in the desired direction.

As an example of one possible use and application of the spring drive which has been described, the driven shaft 11 is shown in Fig. 2 connected to a Geneva gear including a driving member 42 and a gear wheel 43, the gear wheel 43 being connected by a shaft 44 to a switch contact arm 45 which is movable over a plurality of fixed contacts 46. At each half revolution of the driven shaft 11, the movable contact arm 45 moves quickly one step in the desired direction along the fixed contacts.

The invention has been explained by describing and illustrating one preferred form and a possible application thereof but it will be apparent that changes may be made without departing from the spirit of the invention and the scope of the appended claims.

What I claim as new and desire to secure by Letters Patent of the United States, is:

1. A spring drive including a driving shaft and a driven shaft, a spring, means for tensioning said spring from either end, means for holding either end of said spring while the spring is being tensioned from the other end, and means for automatically releasing the spring to rotate the driven shaft after the spring has been tensioned.

2. A spring drive including a driving shaf and a driven shaft, two members rotatable about the axis of the driving shaft, a spring connecting said members, means secured to the driving shaft for rotating one of said members in one direction to tension said spring, means secured to the driving shaft for rotating the other of said members in the opposite direction to tension said spring, means for holding either end of the spring while it is being tensioned by the member at the other end thereof, and means controlled by the driving shaft for releasing the spring to rotate the driven shaft after the spring has been tensioned by the member at either end.

3. A spring drive including a driving shaft and a driven shaft, two members rotatable about the axis of the driving shaft, a spring connecting said members, means secured to the driving shaft and having lost motion connection with each of said members to tension said spring from either end, means for holding either end of the spring while the spring is being tensioned from the other end, and means controlled by the driving shaft for releasing the spring to rotate the driven shaft after the spring has been tensioned.

4. A spring drive including a driving shaft and a driven shaft, two members rotatable about the axis of the driving shaft, a spring connecting said members, a lost motion connection between the driving shaft and each of said members to tension the spring from either end, means for holding either end of the spring while the spring is being tensioned from the other end, and means controlled by the driving shaft for releasing the spring to rotate the driven shaft after the spring has been tensioned by the member at either end.

5. A spring drive including a driving shaft and a driven shaft, two members rotatable about the axis of the driving shaft, a spring connecting said members, each of said members having spaced stops, a projection from the driving shaft for engaging the spaced stops of each of said members, a member connected to the driven shaft and having two pairs of spaced stops, a projection from one of said spring connected members for engaging one of said pairs of spaced stops, a projection from the other spring connected member for engaging the other pair of spaced stops, means for normally preventing rotation of the driven shaft, and means controlled by the driving shaft for automatically releasing the driven shaft to permit rotation thereof.

6. A spring drive including a driving shaft and a driven shaft, the two disks and one plate being rotatable about the axis of the driving shaft, the other plate being secured to the driven shaft, a spring connecting said disks, each of the disks and plates having two spaced stops, a projection from the driving shaft for engaging the stops of each disk, a projection from each disk for engaging the stops of one of the plates, the two plates being connected together, means for normally preventing rotation of the driven shaft, and means controlled by the driving shaft for automatically releasing the driven shaft after a predetermined rotation of the driving shaft.

In witness whereof, I have hereunto set my hand.

GEORGE E. LE COUNT.